United States Patent [19]

Michel

[11] Patent Number: 4,484,777

[45] Date of Patent: Nov. 27, 1984

[54] APPARATUS FOR TENSIONING A COVER SHEET OVER AN OPEN-TOPPED RECTANGULAR BOX OR BUILDING

[76] Inventor: Walter C. Michel, P.O. Box 86, Humboldt, Saskatchewan, Canada, S0K 2A0

[21] Appl. No.: 388,944

[22] Filed: Jun. 16, 1982

[30] Foreign Application Priority Data

Jun. 18, 1981 [CA] Canada .................................. 380064

[51] Int. Cl.³ ............................................. B60J 11/00
[52] U.S. Cl. .................................... 296/98; 296/100; 160/243; 242/75; 135/89; 135/903; 135/DIG. 5
[58] Field of Search .................. 296/98, 100, 101, 32, 296/33, 36; 160/243, 309, 310; 135/89, 115, 903, DIG. 5; 242/75, 75.4, 99; 24/115 R, 115 N, 156, 263 SW

[56] References Cited

U.S. PATENT DOCUMENTS

| 1,744,686 | 1/1930 | Pease ..................................... 160/309 |
| 2,976,082 | 3/1961 | Dahlman ............................... 296/98 |
| 3,061,364 | 10/1962 | Tantlinger et al. ................... 296/100 |
| 3,314,717 | 4/1967 | Wild ...................................... 296/100 |
| 3,806,185 | 4/1974 | Brandjord ............................. 296/98 |
| 4,212,492 | 7/1980 | Johnsen ................................. 296/98 |
| 4,302,043 | 11/1981 | Dimmer et al. ....................... 296/98 |
| 4,380,350 | 4/1983 | Block .................................... 296/98 |

Primary Examiner—David A. Scherbel
Assistant Examiner—Dennis H. Pedder
Attorney, Agent, or Firm—Laubscher, Philpitt & Laubscher

[57] ABSTRACT

Apparatus for drawing taut a cover sheet over a box opening such as a truck box or a walled building of rectangular plan form provides stop members mounted on a longer sidewall presenting stop surfaces spaced below a longitudinal edge, the surfaces forming a socket for captively seating a tubular or bar shaped roller to which the sheet is tangentially attached. The sheet is fully unwound from the roller in covering the opening, and an overhanging sheet portion is tensioned by a fractional turn of the roller additionally in the unwinding direction, causing the roller to press upwardly against a stop surface engaging the top of the roller and to press inwarldy against a stop surface, with the overhanging portion disposed as a rain-shedding eaves maintaining a seal at the longitudinal edge and terminating under a clamp tangent to the roller. When the roller is turned in the winding-up direction it automatically unlocks and swings free, then traverses the sheet roll to the opposite side of the opening to stored position.

15 Claims, 11 Drawing Figures

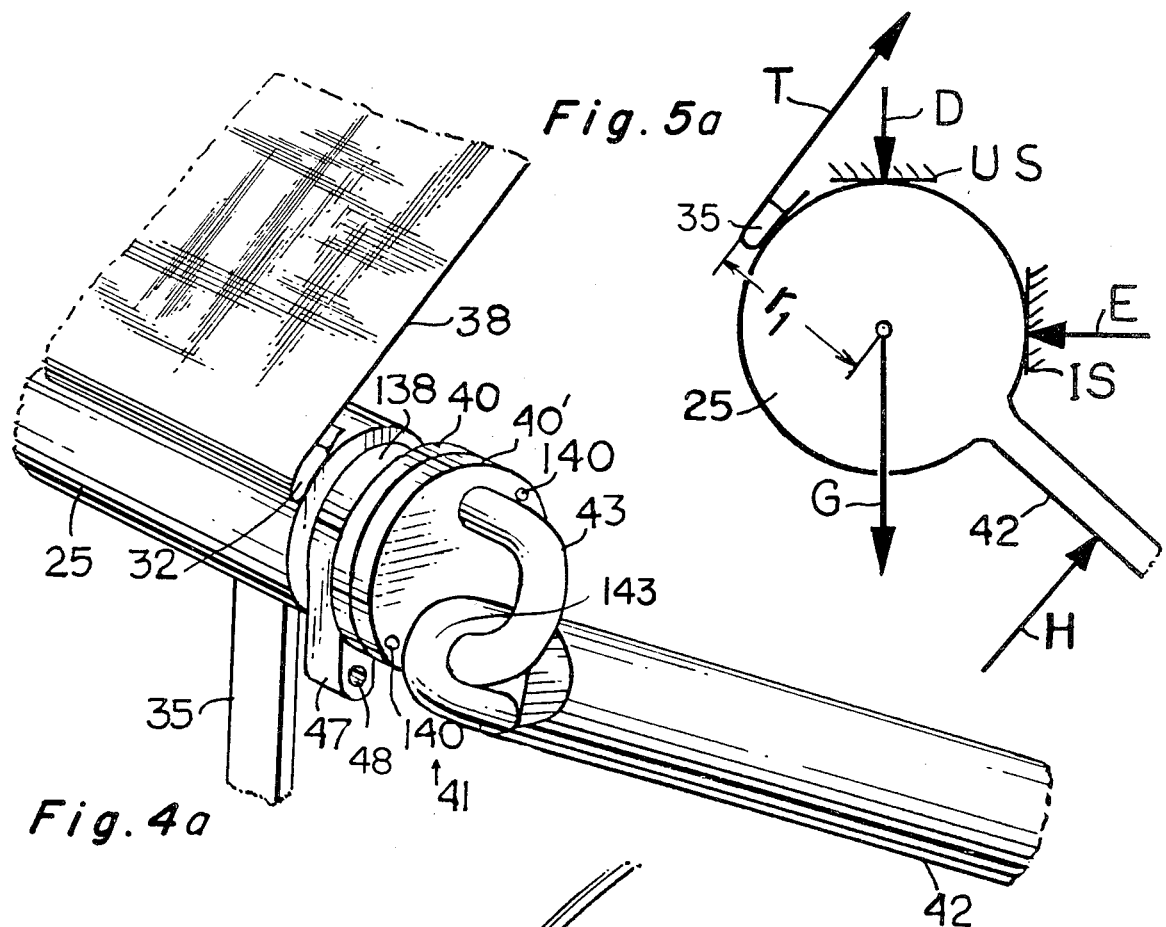
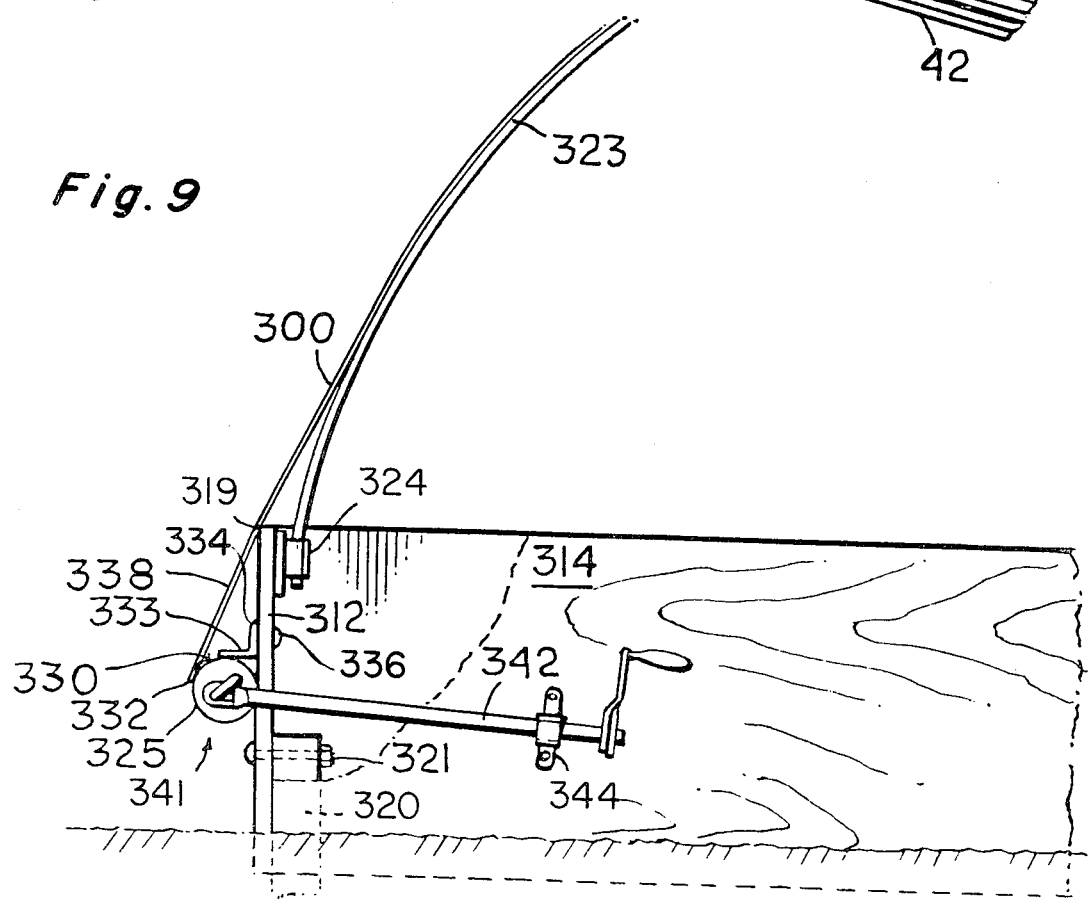

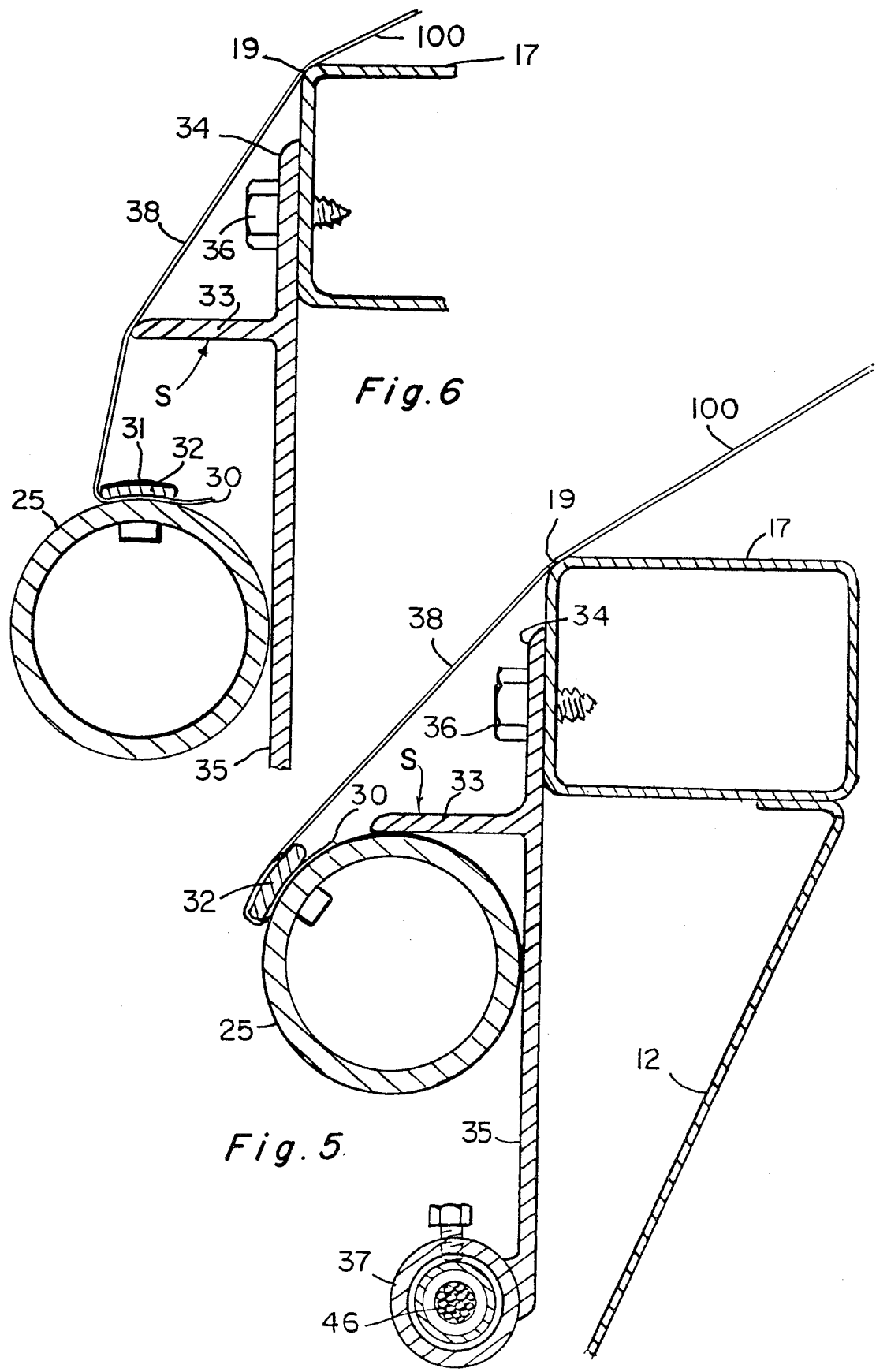

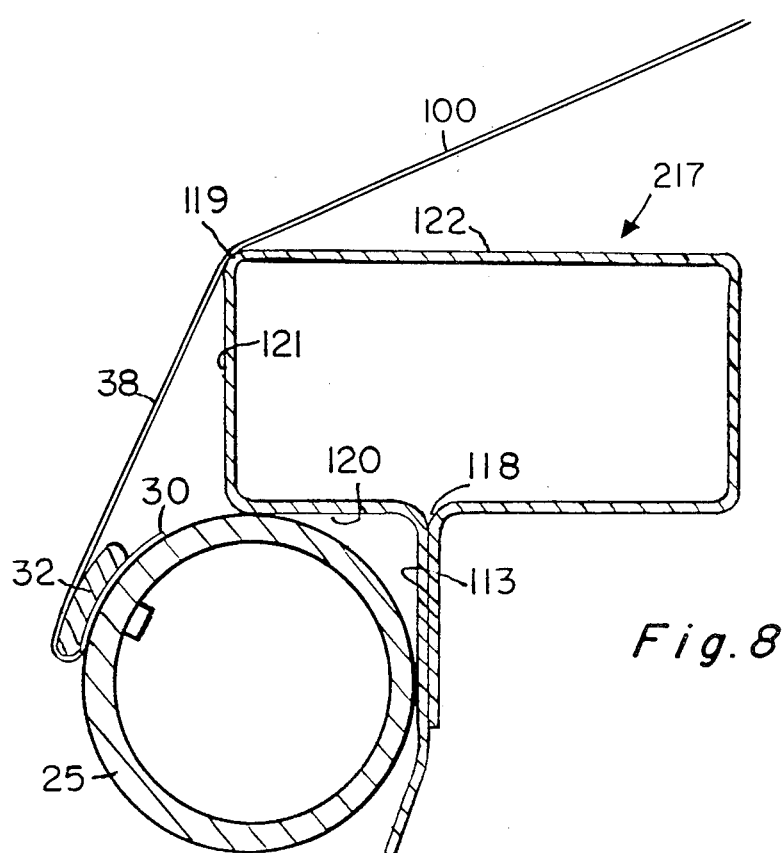
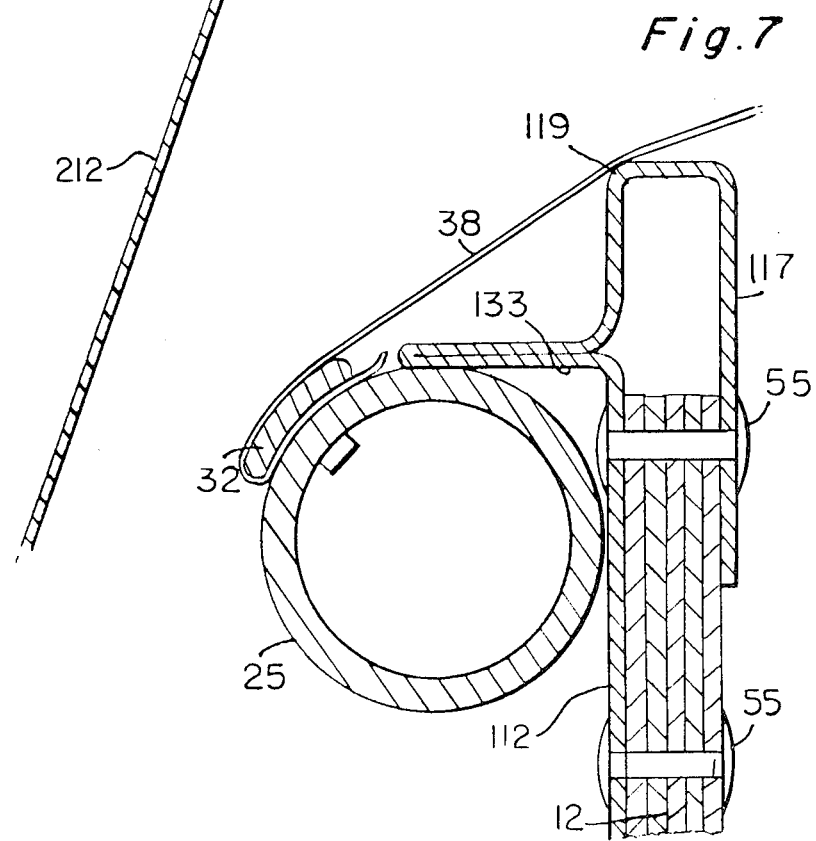

4,484,777

APPARATUS FOR TENSIONING A COVER SHEET OVER AN OPEN-TOPPED RECTANGULAR BOX OR BUILDING

FIELD OF THE INVENTION

This invention relates to improved sheet cover tensioning apparatus for securing a sheet extended as a roof or covering over an open-topped rectangular box. More particularly, the invention relates to apparatus providing cover-sealing contact between a rain-shedding sloped overhanging portion of a cover sheet and a longitudinal top edge of the box or building.

BACKGROUND OF THE INVENTION

Devices for rolling-up and unrolling a fabric cover sheet to respectively uncover or to cover a top opening of a truck box are well known in the prior art as disclosed, for example, by Dahlman U.S. Pat. No. 2,976,082 and by Sargent U.S. Pat. Nos. 3,384,413 and 3,785,694, showing crank-actuated rolls for reeling up or unreeling the cover by traversing the roll from one long edge of the box to the other over an array of roof-shaping arches spanning the width of the box. Such devices however lack an effective and simple means of maintaining the cover taut and in place at highway speeds; one device employs springs which are stretched to bias the roller and tension the sheet as the box is covered, and employs wire holders to secure the roller in place. Other devices make use of a series of straps spaced along the sheet, which require to be made taut in turn and secured to the box sidewall as by tying or clamping. A particularly unsatisfactory tendency of such prior covers to admit dust or rain under the sheet at highway speeds has necessitated overcoming the problem of assuring a good seal between the box wall edges and the cover sheet under all weather and road conditions.

There has been disclosed in Dimmer et al U.S. Pat. No. 4,302,043 a crank-operated bar which when turned beyond the fully-unwound roll position depends from an overhanging sheet portion that overlies a metal plate fixed on the top flat surface of a frame member in the plane of the box opening, the plate being angled downwardly and outwardly. Further unwinding of the bar causes the sheet-covered bar to cramp against the undersurface of the plate when sufficient torque is exerted by the crank arm. While such apparatus provides a drip edge, the sheet often requires to be re-tensioned en route due to the strong frictional clamping caused by the contiguous relation of the sheet and the plate, and excessive wear is experienced along the edge of the plate over which the sheet is sharply folded.

GENERAL DISCUSSION OF INVENTIVE FEATURES

The present invention employs a cylindrical arbor or core, provided with a lever arm, in the form of a wooden, composition, or metal bar or a tubing of metal or plastic, hereinafter termed a "roller", upon which a sheet such as a tarpaulin is wound up to form a roll to uncover the box and from which the sheet is unwound to cover the box opening. The invention seeks to securely lock the roller, when fully unwound, seated externally of and below a longitudinal edge of a box sidewall against stop elements, one stop element engaging the upper side of the bare roller, the other stop element engaging the inward side of the roller, when the cover sheet is tautened by application of torque to the roller. An overhanging portion of the sheet is thus formed as a taut rain-shedding eaves sloping downwardly and outwardly from the longitudinal edge and terminating along the outward surface of the roller.

The arrangement of the present invention avoids contact by any part of the eaves-forming sloped portion with support structure except with the longitudinal edge surface at the upper end of the eaves and with a clamp along the roller at the lower end. The importance of this will be evident in that no chafing or wear or frictional clamping of the sheet can occur, the roller surfaces engaged by the stop elements being entirely bare. The provision of a drip edge along a smooth fold in a marginal edge portion of the sheet passing under a clamp strap attaching the sheet along the roller prevents water from migrating to the box sidewall where the cover sheet is an unsealed fabric such as woven uncoated cloth.

The stop element surfaces which abut the roller respectively along its uppermost and innermost sides may be formed by suitably shaping the sidewall of the box or building, or by mounting suitably formed brackets, angle sections or individual stop members on the sidewall. It is immaterial whether the surfaces are continuous along the full length of the roller or are discrete elemental areas spaced along the length of the roller, provided that the spacing is not so great that bowing or buckling of the roller portions between them would occur under the maximum tension that may be applied to the cover sheet.

The invention also provides effective compression sealing between an unrolled sheet covering and an edge of a wall which may be a longer sidewall of an open-topped box when an overhanging eaves portion of the sheet is folded down in firm contact along such edge at an acute angle to the horizontal, by disposing the upper stop elements below the edge at from about one radius distance to two or more diameters of the roll, where torque is maintained on the roller by locking the lever arm extending therefrom to a box end wall.

The invention also provides apparatus for covering and uncovering an opening of a walled box such as a truck box wherein, when the top edge of the box is set inwardly with respect to a lower vertical sidewall portion, the roller when seated against stop elements does not project beyond the vertical plane of said lower sidewall portion.

This invention further provides roller-seating and locking stop elements particularly adapted for either mounting on a truck box sidewall or for integral forming in such sidewall, wherein a laterally-projecting flange defines upper stop elements and a storage tube for housing an elastic core is attached to and extends longitudinally below the flange, the cord being connected by its ends to the ends of the roller to bias it to unwound position.

SUMMARY STATEMENT OF THE INVENTION

The invention essentially consists in apparatus for covering a rectangular top opening of a box structure having sidewalls and a cover sheet fixed to the structure along a first longer sidewall, wherein a roller carries the sheet connected therealong and wound thereupon as a roll for unrolling the sheet across the opening, and stop elements are fixed externally of the opposite sidewall and are spaced below its top longitudinal edge presenting stop surfaces limiting the upward and inward displacement of the roller when the roll is fully unwound and the roller is rotated in the unwinding direction slightly further to tauten an eaves-forming overhanging marginal portion of the sheet.

Accordingly, it is an object of this invention to provide simple yet effective means for maintaining tension in a cover sheet when it has been fully unrolled from a roller to form a sloping overhang portion between a box edge and a roller to which the sheet margin is fastened.

Another object of this invention is to provide roller-seating stop elements externally of an open-topped box for engaging a fully-unwound roller to stably seat it below a top edge of the box to shape a marginal portion of a cover sheet as a rain-shedding eave extending between the edge and the roller.

BRIEF DESCRIPTION OF THE DRAWINGS

The foregoing stated objectives and purposes and others will be made apparent or particularly pointed out hereinafter, and the particular advantages and utility of the invention will be more fully exposed in and by the detailed description of preferred embodiments, to be read in conjunction with the accompanying drawings. These drawings show:

FIG. 4a is a rear perspective view of the roller of FIG. 3 shown under torque developed by a lever arm;

FIG. 5 is a cross-section in a vertical plane taken on line 5—5 of FIG. 4 showing sealing at a longitudinal edge when the cover sheet is tensioned by torque applied to the seated roller;

FIG. 5a is a force diagram relating to FIG. 5 showing forces acting to stably seat the roller against stop elements;

FIG. 6 is a sectional view as in FIG. 5 except that the roller depends freely from an overhanging marginal sheet portion as either just prior to rotation into the FIG. 5 position or just after winding up is initiated following roller release;

FIG. 7 is a sectional view similar to FIGS. 5 and 6 showing an extension mountable on an existing wooden box sidewall providing a straight longitudinal edge for effective sealing;

FIG. 8 is a sectional view of a sheet metal truck box sidewall having a tubular top frame wherein the underside and a vertical wall portion define upper and inner stop elements; and FIG. 9 is an elevation view of a building structure employing cover sheet tensioning apparatus of the invention.

DETAILED DESCRIPTION

Figure 1:
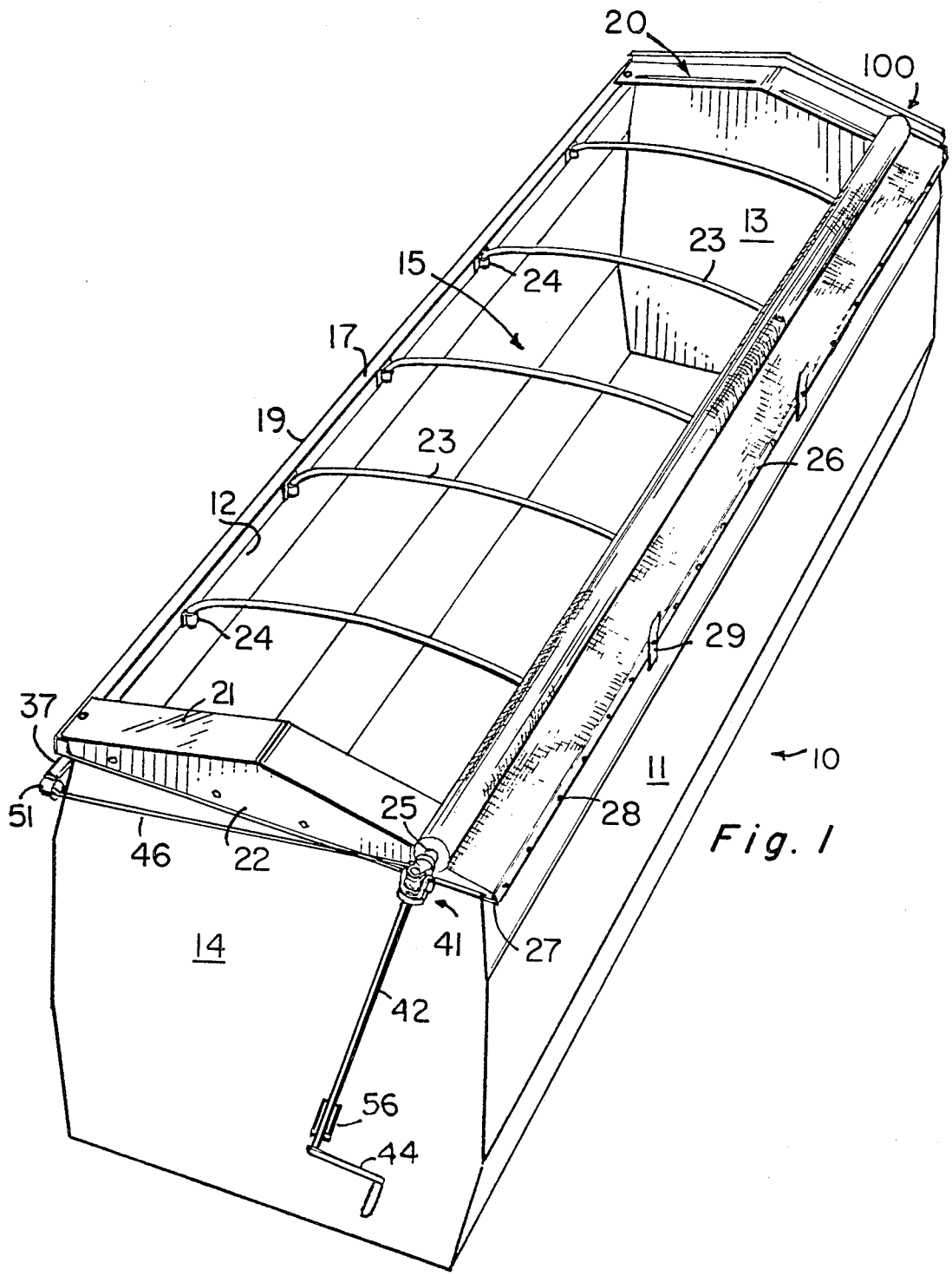
FIG. 1 is a perspective view from the right rear of an open-topped truck box fitted with a cover sheet carried on a roller, almost completely uncovered.
Figure 2:
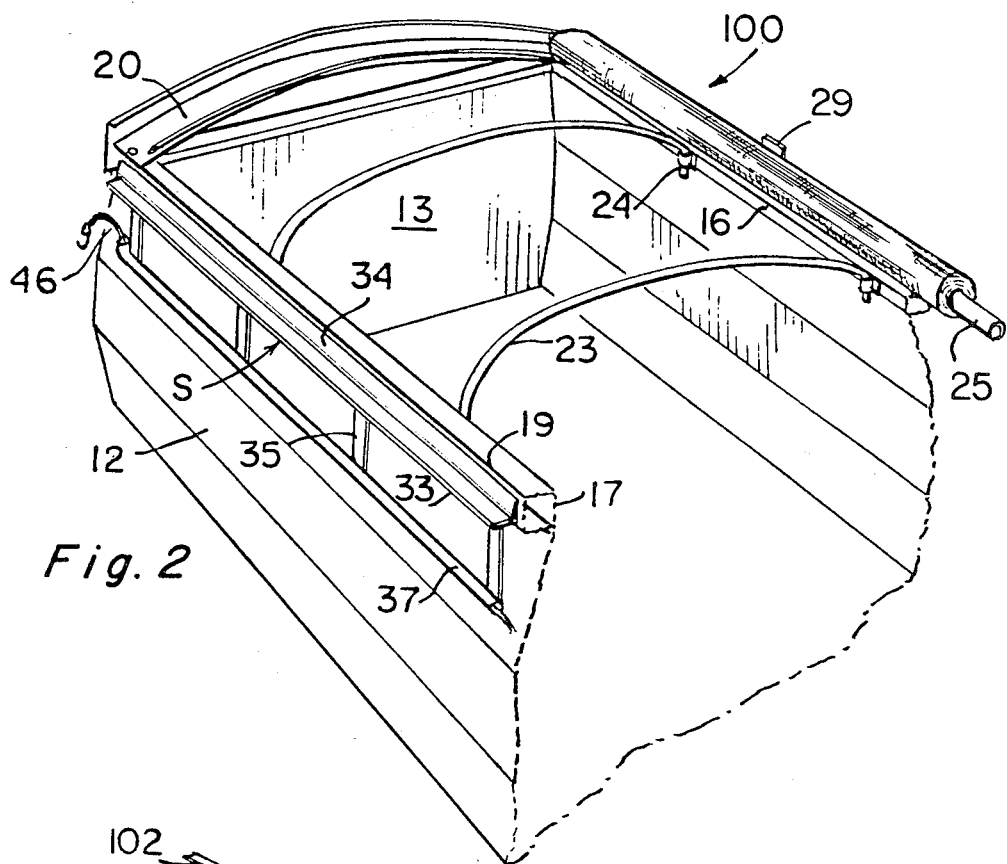
FIG. 2 is a left rear perspective view of part of a box similar to that of FIG. 1, showing a continuous flange serving as upper stop elements and depending straps serving as inner stop elements, mounted along the left sidewall.
Figure 3:
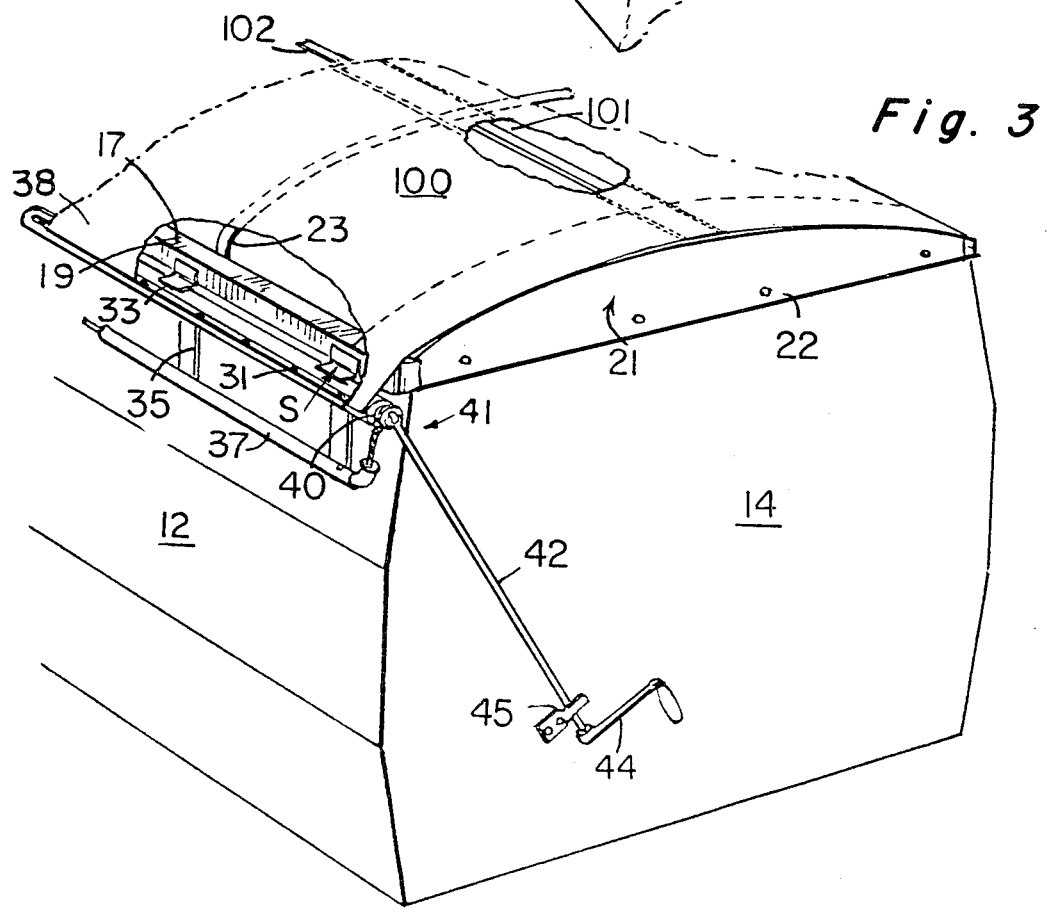
FIG. 3 is a left rear perspective view of part of the box of FIG. 2 showing a cover sheet partly cut away extended over the top opening and the roller locked against stop elements maintaining the sheet under tension by torque exerted by a lever arm.

Referring to FIGS. 1, 2 and 3, a roller-tensioning and locking arrangement according to the invention will be described as a demountable unit for fitting on a conventional open-topped box employed for trucking grain or other particulate solids requiring protection against loss or contamination by precipitation or dust.

Box 10 comprises right and left longer longitudinal sidewalls 11 and 12, and front and rear transverse end walls 13, 14 defining a top opening 15. The opening is bounded by the tubular frame members 16, 17 having rounded long outer edges 18, 19. It is to be understood that other box forms having equivalent long sidewall top edges, or buildings having similar top wall edges, may be fitted with the apparatus according to the invention. The box structure is fitted with conventional front and rear roof-shaping baffles 20, 21 overlying and extending a short distance along the box opening and provided with depending flanges 22 secured to the tubular frames of a respective end wall. A set of removable roof-shaping arches 23 seated in pin-receiving brackets 24 mounted along the inner side surfaces of the sidewall tubular frames provide support for the cover sheet when extended to cover opening 15.

Figure 4:
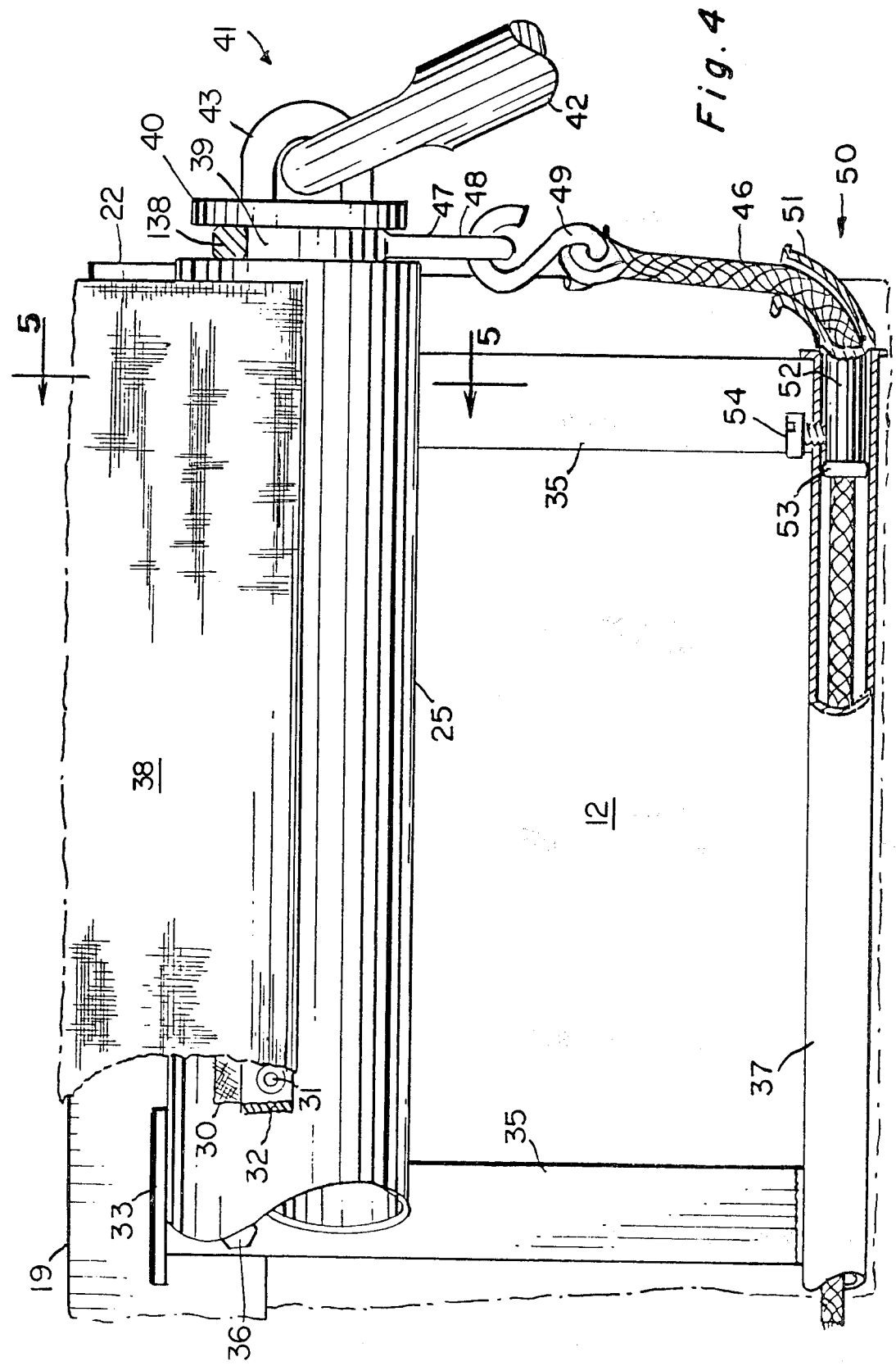
FIG. 4 is a side elevation view in enlarged scale showing the roller of FIG. 3 engaged with stop positions and biased by a tensioned elastic cord.

Referring additionally to FIG. 4, a flexible cover sheet generally designated 100 is shown wound on roller 25 which is coextensive in length with the length of the sidewalls. The roller may comprise steel, aluminum, plastic or other suitable rigid structural bar or tubular materials of diameter between about 5 to 15 cm. or more. Tubular rollers should have wall thickness adequate to transmit the torque required to exert desired tension on the sheet. The sheet may be a woven fabric preferably treated with an impervious flexible coating, or any flexible sheet material appropriate for its intended purpose, and may even be a light gauge metal sheet such as steel, stainless steel or aluminum or aluminum alloy.

One long edge 26 of the cover sheet is reinforced by a metal strap 27 secured therewith along the exterior of tubular top frame 16 as by screw bolts 28. Roll retainer brackets 29 are also secured by bolts 28, the brackets extending upwardly in known arrangement above the sidewall.

The opposite long marginal portion 30 of the cover sheet is clampedly secured tangentially of the roller 25, by arcuately-shaped clamp bars 32 connected to the roller by a series of rivets 31 passed through the bar and roller, as best seen in FIGS. 5 and 6.

The transverse dimension of the cover sheet is chosen to be sufficient to span the box opening and to extend additionally over the tubular frame 17 a distance such that when the roller hangs freely outside the box, the length of the overhanging portion 38 is between about 1.5 to 2 times the diameter of the roller. Such length is appropriate for obtaining an eaves angle of about 45° when the sheet is tensioned, but considerably longer lengths may be utilized where a more steeply-sloped eaves is desired.

Sheet 100 is preferably provided with a longitudinally-extending centered tubular pocket 101 (FIG. 3), formed by securing a strip of sheet material to overlie the sheet, as by stitching. A stiffener bar 102 coextensive with the length dimension of the sheet is inserted into the pocket and restrained by suitable fastening means, as by rivets (not shown). The purpose of the bar is to prevent drooping of the sheet along the highest part of the roof when transverse tension is applied during tightening, which would tend to make non-uniform the sealing pressure at edge 19. The bar further aids in the smooth rolling-up and unrolling of the sheet and avoiding skewing.

In one embodiment of the invention illustrated in FIGS. 2, 5 and 6, the roller locking means S comprises an L-shaped angle iron member having a horizontal lateral flange portion 33, an upwardly extending vertical portion 34, and a plurality of longitudinally spaced downwardly extending vertical support portions 35. The angle iron section is mounted on the box side wall 12 to cause the lower surface of the horizontal flange portion 33 to be spaced downwardly from the upper sidewall edge 19 to a distance of from about one-half to two times the diameter of the roller 25. Horizontal flange 33 extends laterally outwardly from the support portions 35 a distance of about ⅝ to 1 times the radius of roller 25. The integral angle iron structure comprising these stop or roller locking elements is mounted in any suitable way on the exterior of sidewall 12, as by screw bolts 36 passed through flange 34 and tubular frame 16.

A tubular housing 37 is connected with the lower ends of support portions 35, as by welding, the length of the support portions being at least twice the diameter of roller 25.

When the roller 25 in its freely hanging position (FIG. 6), suspended by marginal sheet portion 38, is caused to be rotated in the unwinding direction by exerting counter-clockwise torque thereto using lever arm 42, a fractional turn of the roller will cause it to be lifted relatively to clamp bar 32, bringing its uppermost bare surface into contact with the underside of flange 33, as seen from FIG. 5. At the same time a horizontal component of the tension force produced in overhanging sheet portion 38 urges the roller inwardly, i.e. against vertical straps 35. The cover sheet is thereby made taut, and firm contact is developed between it and longitudinal edge 19, while the overhanging portion is disposed at a rain-shedding angle to the horizontal, of 45° or greater, which angle should be somewhat larger than the angle with the horizontal of the sheet portion overlying opening 15. Therefore, a seal is maintained along a surface of folding including edge 19; such edge is preferably smoothly rounded to avoid creasing or chafing of the sheet material.

It will be evident therefore that an excellent continuous seal is assured at edge 19, preventing particulate material from escaping from the box, or wind or precipitation from entering over frame member 17. As much pressure as desired can be readily produced between the sheet and the longitudinal edge, simply by applying increased torque to roller 25, provided that the angle of folding at edge 19 is at least a few degrees, e.g. about 5° to 20° or more. The manner in which such sealing pressure is developed, and in which the roller is stably held against the stop elements, may be understood by referring to FIG. 5a. In the diagram, it may be seen that the roller, when in the locked position of FIG. 5, will be in equilibrium with the several forces acting on it. These forces, represented by the vectors diagrammed, comprise:

the gravity force G acting downwardly;
the tension force T acting at radius $r_t$, i.e, beyond the roller surface and directed upwardly and inwardly;
the lever arm force H acting upwardly and inwardly on rigid arm 42 which is coupled to and extends radially of roller 25;
the downward force D exerted by upper stop US (flange portion 33); and
the outward force E exerted by inner stop IS (vertical flange portion 35).

The vertical components of forces T and H obviously are sustained by opposing downward forces D and G, while the horizontal inward components of T and H obviously are equalled by outward reaction force E, so that the roller remains immovable, so long as tension force T together with arm force H at least slightly exceeds gravity force G. Such gravity force, due to the small mass of the roller and attached elements, is relatively small and hence is overcome by low tension in the sheet. If the cover is tautened by a higher tensile force, by increasing the arm force H, the roller experiences correspondingly increased downward and outward reaction forces by stop elements as it is pressed more strongly against stop US and IS. It will be evident that moderate elasticity of the cover sheet will tend to maintain the roller seated and stably locked when arm 42 is angularly fixed with an initial tension T established.

It is also to be noted that no part of the overhanging portion 38 of the sheet touches any structural part, thereby avoiding wear. Moreover when clamp bar 32 has smoothly-rounded edges, the sheet folded around the bar forms a drip edge discharging water smoothly well to the outside of the box sidewall and below the top edges.

Each end of the roller 25 is provided with an axially-extending hub 39, best seen in FIG. 4 showing the rear end. Hubs 39 are of reduced diameter and terminate in a disc 40 on the outer face of which is mounted any suitable swivel drive means 41 allowing shaft 42 engaged therewith to be angularly disposed at right angles with the axis of the roller. The arrangement depicted in FIG. 4 comprise a pair of U-shaped half-links 43, 143 linked together and secured by their leg portions to the outer face of the disc and to the end of shaft 42, respectively. In the Figure the roller is shown under torque transmitted by rotation of shaft 42 about its axis.

Alternatively, a universal joint coupling is shown in FIGS. 1 and 3. Other mechanisms may be employed for the same purposes. To lock the roller with the cover 100 in the fully closed condition of FIG. 3, crank arm 42 is rotated by handle 44 in the counter-clockwise direction to cause roller 25 to engage flange 33 and straps 35 as shown in FIG. 5, whereupon crank arm 42 is pivoted inwardly about its universal joint coupling to a position contained in a vertical plane parallel with the rear box wall 14, whereupon the crank arm is retained in the keeper bracket 45 fixed on the rear wall.

In FIG. 4a shaft 42 is shown lying in a vertical plane with links 43, 143 engaged so that a force applied to swing the shaft upwardly develops torque tending to tighten the cover margin portion 38. To facilitate locating shaft 42 conveniently low along rear wall 14 when sufficient tension has been developed, an adjustable connection is provided between the roller 25 and universal joint 41. Such adjustable connection may take any of a number of forms; one simple arrangement provides a companion disc 40' on which universal joint 41 is mounted and which is selectably fastened against disc 40 fixed on hub 39. Suitable fastenings such as pins or rivets 140 lock the margins of the discs together at a desired angular relationship, with shaft 42 disposed at about 45° from the vertical.

In order to assist the unwinding of the rolled-up cover sheet when the roll is in its stored position overlying right-hand sidewall 11, an elastic cord 46 is provided, housed in the tube 37, and connected by its ends with rings 138 rotatably mounted on roller hubs 39 and captively retained between the end of the roller and disc 40. As shown in FIG. 4 the rear ring includes a radial tab portion 47 formed with an eye 48 into which an S-shaped hook 49 carried on the cord end is removably attachable; a similar rotatable connection for the cord (not shown) is provided at the front end of the roller. The hubs 39 lie respectively in planes ahead of front wall 13 and behind rear wall 14, so that as the cover sheet is rolled up or unrolled, the stretched cord ends may extend partly along the respective end walls, as seen from FIG. 1.

The cord requires to be freely slidable in housing tube 37 and tubular guides 50 terminating the tube, as the cord elongates during uncovering and contracts during the covering of box opening 15. Because the external position must take up different angles, changing from nearly horizontal to vertical, guides 50 are preferably bell-mouthed, and are held rotatably captive in the ends of tube 37. The guide has a curved mouth portion 51 and a straight shank portion 52 received within the tube and terminating in a thickened wall 53. A screw 54 threadedly engaged in the tube wall projects toward shank portion 52, preventing the guide from being pulled out but allowing it to align with the free length of cord extending from the mouth.

Because the forward roof-shaping baffle 20 normally is provided with an upwardly-extending wind deflector flange (not shown) which prevents lifting of the cover sheet when overlying the box opening, use of a roller having a minimum diameter of at least 5 cm requires that the height of such deflector flange not exceed about 2 cm. The forward hub 39 may be somewhat reduced in diameter to accomodate a higher deflector flange. In any case, as with the rear hub, both hubs must extend a sufficient distance beyond the respective end walls 13, 14 to permit the cord to extend freely along each end wall but out of contact therewith.

Various alternate embodiments may be devised within the scope of the invention; for example, flanges 34 and support 35 may be unitary, or flanges 33 and 34 may comprise either interrupted or continuous metal angle section integrally joined with depending spaced straps 35. Moreover, as shown in FIG. 7, where an existing sidewall made from lumber or plywood does not provide a satisfactorily smooth and straight sealing edge 19, an improved edge may be provided by mounting formed sheet metal channel 117 having upper and inner stop elements integral therewith. Such channel 117 may be fitted on the existing sidewall 12 of the box and secured thereto by rivets 55, with metal sidewall 112 disposed externally and providing inner stop elements thereby. An integral lateral flange 133, either affixed as by welding or brazing, or formed by folding the sidewall 112, is disposed a distance of about one roller diameter below the top longitudinal edge 119 to provide upper stop elements along its underside. Such fitting has the advantage that, if desired, a cord housing may be integrally formed, allowing quick mounting to a wooden sidewall to stiffen the top edge and provide optimum sealing.

While the foregoing description has dealt with apparatus for fitting to an existing open box structure, the invention may advantageously be practiced with boxes constructed with a tubular frame in the plane of the box opening as shown in FIG. 8.

In FIG. 8 the main part of an upright box sidewall made of metal is formed with an upper sheet portion 212 sloping upwardly and inwardly as is conventional, the sidewall terminating in a short vertical portion 113. This vertical portion should be at least five-eighths of one roller diameter in height, and provides the inner stop elements. An integral tubular frame 217 of rectangular section terminates the vertical portion 113, the junction 118 made with the horizontal underside 120 of the frame lying about one-half to five-eighths of a roller diameter inwardly from the outer side 121 of the frame. A rounded corner 119 is formed at the junction between vertical side 121 and the horizontal upper side 122, to provide a smooth longitudinal edge seal between a sheet cover 100 and the frame.

When the marginal portion 38 is under tension, roller 25 engages frame sides 120 and 113. The vertical height of side 121 should preferably be between about five-eighths and one roller diameter, since the slope of marginal portion 38 becomes steeper as the height of such wall portion increases. At very steep angles the inwardly-directed force component against sidewall portion 113 would be considerably less than when the marginal portion has an angle of about 45°.

When the upper frame 217 is made relatively wide, the lateral rigidity is enhanced, so that good sealing is obtained in very long boxes under a wide variety of load conditions.

While the foregoing description has dealt with a specific application of the invention to box forms used on freighting vehicles such as highway and farm trucks, the utility is by no means limited thereto; other box forms may be fitted with analogous roof-shaping arch frameworks and provided with exteriorly mounted upper and inner stop elements for stably locking a sheet-tensioning roller having a lever arm. Rectangular buildings such as sheds, shelters of all kinds, stadia, and greenhouses, for example, may be provided with quickly removable cover sheets or have such sheet roofs spread quickly over their roof framing, employing the devices of the invention. In illustration thereof, but without in any way limiting the practice of the invention in such use, a cover sheet 300 is shown in FIG. 9 spread over roof arches 323 held in retainer brackets 324 fitted along the upper inner margins of longer sidewalls 312, which may be of lumber, plywood, or may be assembled structural panels. Such sidewall is supported in upright attitude in any suitable manner, as by being mounted on posts 320 and connected thereto by bolts 321.

An upper longitudinal edge 319 of the sidewall is engaged by the cover sheet which has an eaves-forming portion 338 overhanging below and exteriorly of the edge, and which is folded at least slightly over the edge to form a seal, if such is desired.

A roller 325 which may be a plastic, metal, or composition bar or tubing has a lower edge portion 330 of the sheet clampedly secured tangentially of the roller under clamp bar 332, the portion 338 overlying the outer surface of the clamp bar. A horizontal angle iron including a horizontal flange portion 333 and a vertical flange portion 334 projects laterally outwardly about five-eighths of a roller diameter from the sidewall, the flange portion 334 being attached (for example, by bolts 336) spaced several roller diameters below edge 319.

Lever arm 342 which is swivelably connected to the roller for applying torque is adjustably secured by clamp 344 to end wall 314, at a position developing suitable tension in the sheet, causing the roller to engage upper stop elements provided by flange portion 333 and also to engage the exterior of the sidewall which provides the inner stop elements.

I claim:

1. Apparatus for covering an open-topped rectangular box (10) having opposed pairs of vertical side (11, 12) and end (13, 14) walls, and means (23) defining a roof-shaping framework for said box, comprising
   (a) a rectangular cover sheet dimensioned to cover the box opening, said cover sheet having a width dimension that is greater than the width dimension of the box, one of the longer edges of said cover sheet being secured to one (11) of said side walls;
   (b) a roller (25) connected with the other longer edge of said cover sheet;
   (c) means (42, 41) for rotating said roller in a direction to wind said cover onto the roller and thereby uncover the box opening, said rotating means being operable in the opposite direction to unwind the cover sheet from the roller and to spread the cover sheet over the roof framework, said roller, when fully unwound, hanging from the adjacent marginal portion (38) of the cover sheet downwardly in spaced relation below the upper edge (19) of, and adjacent the external surface of, the other side wall (12);
   (d) stop means (S) connected with the outer surface of said other side wall (12) for locking said roller in a position in which the cover member extends over the box opening, said stop means including:
      (1) means (33) defining a downwardly facing horizontal stop surface extending laterally outwardly from said other side wall; and
      (2) means (35) defining an outwardly facing vertical stop surface orthogonally arranged relative to, and extending downwardly from, said first stop surface;
   (e) means (42, 45) maintaining said roller, when in an unrolled condition, in a locked condition in engagement with both of said horizontal and vertical stop surfaces, said stop means being so vertically spaced from said longitudinal edge (19) of said other wall that said cover sheet is maintained taut when said roller is in the locked condition;
   (f) a horizontal tubular open-ended housing (37) connected in spaced relation below said stop means;
   (g) an elastic cord (46) slidably mounted in said tubular housing; and
   (h) means rotatably connecting the ends of said cord with the ends of said roller, respectively, said roller having hub portions (39) of reduced diameter extending axially from the ends of the roller and projecting beyond the planes of the front and rear end walls, said connecting means including ring members (138) rotatably mounted on said hubs, respectively, and means (49) removably securing a respective end of said cord to each ring member, thereby to bias said roller toward the unwound position.

2. Apparatus as defined in claim 1, wherein said horizontal tubular housing is disposed a distance at least two times the roller diameter below said horizontal stop surface, and further including a pair of cord guide members (51) rotatably connected with the ends of said tubular member, respectively, each of said cord guide members having a curved terminal portion.

3. Apparatus for covering an open-topped rectangular box (10) having opposed pairs of vertical side (11, 12) and end (13, 14) walls, and means (23) defining a roof-shaping framework for said box, comprising
   (a) a rectangular flexible cover sheet dimensioned to cover the box opening, said cover sheet having a width dimension that is greater than the width dimension of the box, one of the longer edges of said cover sheet being secured to one (11) of said side walls;
   (b) a roller (25) connected with the other longer edge of said cover sheet;
   (c) means (42, 41) for rotating said roller in a direction to wind said cover onto the roller and thereby uncover the box opening, said rotating means being operable in the opposite direction to unwind the cover sheet from the roller and to spread the cover sheet over the roof framework, said roller, when fully unwound, hanging from the adjacent marginal portion (38) of the cover sheet downwardly in spaced relation below the upper edge (19) of, and adjacent the external surface of, the other side wall (12);
   (d) stop means (S) arranged on the external surface of said other side wall (12) for locking said roller in a position in which the cover member extends over the box opening, said stop means including:
      (1) means (33) defining a downwardly facing horizontal stop surface extending laterally outwardly from said other side wall; and
      (2) means (35) defining an outwardly facing vertical stop surface orthogonally arranged relative to, and extending downwardly from, said stop surface; and
   (e) means (42, 45) maintaining said roller, when in an unrolled condition, in a locked condition with the bare surface of the roller (25) in direct surface-to-surface contact with the horizontal and vertical stop surfaces, whereby the marginal portion (38) of the cover sheet contacts only the upper edge of the side wall and the roller to eliminate chafing or wear-associated frictional clamping of the cover sheet, said stop means being so vertically spaced from said upper longitudinal edge (19) of said other wall that said cover sheet is maintained taut when said roller is in the locked condition.

4. Apparatus as defined in claim 3, wherein said horizontal stop surface (120) is spaced below the longitudinal edge (19) of said other side wall, said vertical stop surface (113) being spaced inwardly a distance of about one-half to about five-eigths of a roller diameter with respect to said longitudinal edge.

5. Apparatus as set forth in claim 3, wherein said horizontal stop surface is spaced below and outwardly of the longitudinal edge (19) of said other side wall, said vertical stop surface being spaced vertically below said longitudinal edge.

6. Apparatus as defined in claim 3, wherein said horizontal means defining said stop surface comprises a continuous horizontal flange (33) extending laterally outwardly relative to said other side wall, the underside of said flange being spaced below said upper edge a distance of from about one-half to two times the diameter of said roller; and further wherein said vertical stop surfaces comprise vertical support members (35) connected at spaced intervals to, and depending downwardly from said horizontal flange portion, the width of said horizontal flange being from about five-eighths to one times the roller radius.

7. Apparatus as defined in claim 6 wherein said stop means comprises a metal angle iron section having a horizontal flange portion defining said horizontal stop surface, and a vertical flange portion secured to the outer surface of said other side wall.

8. Apparatus as defined in claim 3, wherein said vertical stop surface is arranged beneath said longitudinal side wall edge, thereby to cause the marginal portion (38) of said cover sheet between said longitudinal edge and said roller to define an angularly downwardly sloping eave structure.

9. Apparatus as defined in claim 8, wherein said cover sheet is connected along said roller by clamp means including a clamp bar (32), and means (31) connecting the clamp bar with said roller with the cover sheet clamped therebetween.

10. Apparatus as defined in claim 3, wherein said roller rotating means comprises a drive shaft (42) having a crank handle (44), swivellable coupling means (41) connecting said drive shaft with one end of said roller, and means (45) for connecting said drive shaft with the rear end wall of the box when said drive shaft is swivelled to extend approximately at right angles to the length of the roller for tensioning said sheet by swinging said arm in a vertical plane adjacent an end wall of said box.

11. Apparatus as defined in claim 10, wherein said coupling means comprises a pair of half links of U-shaped configuration linked together and connected by their legs to the end of the drive shaft and to the end of the roller, respectively.

12. Apparatus as defined in claim 10, wherein said coupling means comprises a universal joint connected between said drive shaft and said roller.

13. Apparatus as defined in claim 10, wherein said coupling means includes means for adjusting the angular relationship between said roller and said lever arm.

14. Apparatus as defined in claim 3, wherein said other side wall (212) comprises a tube (217) of rectangular cross-section defining said box opening, the junction (118) of said side wall with the lower horizontal side of said tube being spaced inwardly from the outer vertical side (121) of the tube a distance of from one-half to five-eighths of the roller diameter, the box side wall extending vertically downwardly from the junction a distance of at least five-eighths of a roller diameter.

15. Apparatus as defined in claim 9, wherein said cover sheet contains intermediate its long edges a longitudinally extending pocket (101) receiving a stiffener bar.

* * * * *